(12) United States Patent
Bochterle et al.

(10) Patent No.: US 11,320,295 B2
(45) Date of Patent: May 3, 2022

(54) DOSING UNIT AND METHOD FOR DOSING A LIQUID

(71) Applicant: Festo SE & Co. KG, Esslingen (DE)

(72) Inventors: Martin Bochterle, Fellbach (DE); Bengt Erich Wunderlich, Ostfildern (DE); Matthew Peterson, Watertown, MA (US)

(73) Assignee: FESTO SE & CO. KG, Esslingen (DE)

( * ) Notice: Subject to any disclaimer, the term of this patent is extended or adjusted under 35 U.S.C. 154(b) by 341 days.

(21) Appl. No.: 16/396,147

(22) Filed: Apr. 26, 2019

(65) Prior Publication Data

US 2020/0340843 A1 Oct. 29, 2020

(51) Int. Cl.
| G01F 15/06 | (2006.01) |
| G01F 11/32 | (2006.01) |
| G01F 15/063 | (2022.01) |
| G01N 35/10 | (2006.01) |

(52) U.S. Cl.
CPC ............ *G01F 15/063* (2013.01); *G01F 11/32* (2013.01); *G01N 35/10* (2013.01)

(58) Field of Classification Search
CPC ........ G01F 15/063; G01F 11/32; G01F 22/02; G01F 11/28; G01F 1/74; G01N 35/10; G01N 35/1095; G01N 35/1016; G01N 35/00; G01N 35/00623; G01N 2035/00633; G01N 35/1002; G01N 35/00871; G01N 33/543; G01N 35/02; G01N 35/1004; G01N 2035/1018; B67D 3/0041; B67D 3/0058; B23Q 17/09; B23Q 11/10; G08B 21/18; G08B 5/36; G01M 1/36; G01M 3/26; A61B 1/00
See application file for complete search history.

(56) References Cited

U.S. PATENT DOCUMENTS

| 7,303,728 B2 | 12/2007 | Boillat et al. |
| 2002/0011276 A1* | 1/2002 | Sander .................. F04B 43/043 141/59 |
| 2009/0041628 A1* | 2/2009 | Kakizaki ............ G01N 35/1004 422/68.1 |
| 2009/0199538 A1* | 8/2009 | Boe ........................ F01N 3/208 60/274 |
| 2019/0321815 A1* | 10/2019 | Schmid .............. G01N 35/1072 |

* cited by examiner

*Primary Examiner* — Kathryn Wright
*Assistant Examiner* — Curtis A Thompson
(74) *Attorney, Agent, or Firm* — Hoffmann & Baron, LLP

(57) ABSTRACT

Dosing unit for dosing liquids, having a fluid unit for selectively providing an overpressure and a negative pressure on a working gas, which is accommodated in a fluid channel which is connected at a first end region to the fluid unit and which includes a second end region, having a first valve unit and having a second valve unit, which are arranged spaced apart from one another along the fluid channel and are each designed for selectively blocking or releasing the fluid channel in order to form in the fluid channel a fluid reservoir which is delimited by the two valve units and is provided for storing working gas, having a control unit for controlling the valve units, the fluid reservoir being assigned a pressure sensor which is designed to provide a pressure signal as a function of a working gas pressure and is electrically connected to the control unit.

3 Claims, 2 Drawing Sheets

DOSING UNIT AND METHOD FOR DOSING A LIQUID

BACKGROUND OF THE INVENTION

The invention concerns a dosing unit for dosing liquids. The invention also concerns a process for dosing a liquid.

A liquid dispensing unit known from U.S. Pat. No. 7,303,728 B2 comprises a dispensing member having a conduit through which a transport liquid can be conveyed, a valve being arranged at one end of the conduit and a dispensing needle being arranged at another end of the conduit, measuring means being provided for measuring a flow rate of the transport liquid in the conduit and conveying means being provided for moving the transport liquid through the conduit in one direction or the other. Control means are further provided which are adapted to process measuring signals from the measuring means and to drive the valve and the conveying means to move a certain amount of liquid so that a predeterminable amount of liquid to be dispensed can be sucked into the dispensing needle and subsequently dispensed again.

SUMMARY OF THE INVENTION

The purpose of the invention is to specify a dosing unit and a method for dosing a liquid that can be used to perform more precise liquid dosing.

This task is solved with a dosing unit according to the invention. The Dosing unit comprises a fluid unit adapted to selectively provide a positive pressure (overpressure) and a negative pressure (partial vacuum) on a working gas, the working gas being received in a fluid channel which is connected at a first end portion to the fluid unit and which comprises a second end portion adapted to receive and discharge a predeterminable volume of liquid, and a first valve unit and a second valve unit, which are arranged at a distance from one another along the fluid channel and are each designed to selectively block or release the fluid channel in order to form in the fluid channel a fluid reservoir which is limited by the two valve units and is intended for storing working gas, and a control unit for controlling the first valve unit and the second valve unit, the fluid reservoir being assigned a pressure sensor which is designed to provide a pressure signal as a function of a working gas pressure and which is electrically connected to the control unit.

The fluid unit is designed both for providing an positive pressure (overpressure) on the working gas and for providing a negative pressure (partial vacuum) on the working gas. As an example, a pressure in the fluid reservoir can be set in an interval between 0.5 bar and 1.5 bar using the fluid unit. Under the assumption that the dosing unit is operated in an environment in which an ambient pressure of 1 bar is present, when the working gas is subjected to a pressure of less than 1 bar and a fluidically communicating connection is made between the fluid reservoir and the second end region of the fluid channel, a suction process for liquid can be carried out which is to be temporarily accommodated in the second end region of the fluid channel. By applying a pressure greater than 1 bar to the working gas and in the presence of a fluidically communicating connection between the fluid reservoir and the second end region of the fluid channel, the volume of liquid absorbed in the second end region of the fluid channel can be dispensed or metered.

Preferably it is intended that the fluid reservoir has an exactly defined volume. It is particularly preferred that a volume of the channel section of the fluid channel, which is connected to the second valve unit and extends to the second end region of the fluid channel, is also precisely defined. In this case, after a previous setting of a predetermined pressure in the fluid reservoir, which is made when the second valve unit is closed and which may be a negative pressure or an overpressure relative to an ambient pressure, after closing the first valve unit and opening the second valve unit, a precisely predictable pressure will occur in the total volume formed by the fluid reservoir and the duct section extending to the second end region.

If it is additionally assumed that the second end section of the fluid channel is immersed in a liquid to be dosed in a defined manner and that the working gas is subjected to a negative pressure, a suction process for the liquid takes place in the second end section after closing the first valve unit and opening the second valve unit until a force equilibrium is reached between the working gas and the volume of liquid sucked in. Depending on the differential pressure between the fluid reservoir and the fluid channel adjacent to the second valve unit and extending to the second end area, an exact prediction can be made of the resulting pressure for the working gas and of the quantity of liquid sucked in.

This also applies in the same way in the event that the fluid reservoir is first subjected to an overpressure relative to the ambient pressure and, after the first valve unit has been closed and the second valve unit has been opened and the associated pressure equalization between the fluid reservoir and the fluid channel adjacent to the second valve unit and extending as far as the second end region has been achieved, a quantity of liquid taken up in the second end region is output, the quantity of liquid being optionally only partially or completely output.

The pressure sensor is used to determine a pressure level for the working gas in the fluid reservoir and to provide an electrical pressure signal, which may be either an analogue signal or a digital signal, to the control unit. The control unit, which may be in the form of an analogue circuit or which may be in the form of a digital circuit, in particular with a microprocessor or microcontroller and with software capable of running on it, is arranged to compare the pressure signal provided by the pressure sensor with a threshold value. The threshold value may be provided by a calculation of the control unit or may be extracted from a storage of the control unit. Preferably, the control unit is designed to take appropriate measures, depending on a result of this comparison, to ensure that a pressure corresponding to the threshold value is present in the fluid reservoir.

For example, it can be provided that the control unit is designed for controlling the fluid unit and activates or deactivates the fluid unit as a function of the pressure in the fluid reservoir. In particular, it may be provided that the control unit is used for a pressure-dependent control of the fluid unit taking into account the pressure signal of the pressure sensor, in order to enable a predeterminable pressure to be set in the fluid reservoir when the first valve unit is open.

The control unit can also be used to open and close the first valve unit and the second valve unit. The control unit is especially designed for an independent control of the first valve unit and the second valve unit.

As an example the first valve unit may be operated, in particular exclusively, time-controlled. In such an operating mode for the Dosing unit, a pressure-dependent control of the fluid unit by the control unit is provided, the control unit controlling the fluid unit in such a way that it sets a desired pressure level for the working gas in the fluid reservoir during a predetermined opening period for the first valve unit and holds it until the first valve unit closes. Subsequently it may, for example, be provided to carry out a time-controlled activation of the second valve unit or a activation of the second valve unit which is pressure-controlled as a function of the pressure signal of the pressure sensor in order to suck a predeterminable quantity of liquid into the second end region of the fluid channel or to discharge it from the second end region of the fluid channel as a function of a previous application of underpressure or overpressure to the fluid reservoir.

Advantageous further embodiments of the invention are the subject of the subclaims.

It is useful if the fluid reservoir has a larger cross-section and/or a larger volume than the fluid channel upstream of the first valve unit and/or than the fluid channel downstream of the second valve unit. Such a design of the fluid reservoir and the respective sections of the fluid channel is of particular interest if the fluid reservoir and the respective sections of the fluid channel away from the fluid reservoir are designed as circular cylindrical bores. A diameter of the fluid reservoir may be larger than a diameter of the portion of the fluid channel extending between the first valve unit and the first end portion, and a diameter of the fluid reservoir may be larger than a diameter of the portion of the fluid channel extending between the second valve unit and the second end portion. In particular, this makes it possible to achieve a compact design for the dosing unit.

It is preferred that a fluid choke or fluid throttle having a defined fluid flow resistance for the working gas is arranged between the second valve unit and the second end region, wherein the fluid flow resistance of the fluid choke is in an interval between 10,000 and 10,000,000 with respect to a flow resistance of a portion of the fluid channel adjacent to the fluid choke. The function of the fluid choke is to provide pressure equalization between the fluid reservoir and that portion of the fluid passage which extends between the second valve unit and the second end portion, at least substantially free of pressure pulses. In particular, a pressure pulse could occur at a time when there is a large pressure difference between the fluid reservoir and the fluid passage and the second valve unit is opened. Preferably, the second valve unit is designed as a switching valve whose switching time is in a range of up to 10 milliseconds and whose valve cross-section is dimensioned such that only small throttle losses occur in the valve unit. In this case, the full pressure difference between the fluid reservoir and the fluid channel is present after a few milliseconds during an opening process for the second valve unit. Without the choking effect or throttling effect of the fluid choke, this would lead to an undesired pressure pulse on the working gas and on the liquid to be sucked in and thus possibly to dosing errors. Preferably it is provided that a flow resistance for a flow of the working gas through the fluid choke is greater than a flow resistance for a flow through the fluid channel adjacent to the second valve unit. This extends a period of time for the pressure equalization between the fluid reservoir and the fluid channel and reduces a probability of a pressure pulse occurring, with which an accuracy of the dosing process can be increased, in particular with respect to a volume of a quantity of liquid to be sucked into the second end region of the fluid channel or to be delivered from the second end region of the fluid channel.

In the case of a further embodiment of the invention, it is provided that the control unit is designed for a pressure-dependent control of the first valve unit and the second valve unit. With such a procedure, the fluid unit can be operated in a controlled mode (open loop), for example to provide a negative pressure and an overpressure on the working gas. The pressure of the working gas in the fluid reservoir is influenced by the opening time of the first valve unit, which is influenced by the control unit as a function of the pressure signal of the pressure sensor. As an example, it is provided that the control unit first controls the fluid unit to provide a predeterminable pressure level in the fluid reservoir in order to selectively provide a negative pressure or an overpressure on the working gas in the fluid channel between the fluid unit and the first valve unit. The first valve unit is then actuated in order to cause the first valve unit to open and thus establish a fluidically communicating connection between the fluid unit and the fluid reservoir, the second valve unit being closed at this time. The first valve unit is kept in an open state by the control unit until the pressure signal of the pressure sensor, which is provided to the control unit and is dependent on the pressure in the fluid reservoir, can be used to determine that the pressure in the fluid reservoir corresponds to a predetermined pressure value. At this point, a suitable control or change of control for the first valve unit follows in order to interrupt the fluidically communicating connection between the fluid unit and the fluid reservoir. Furthermore, at this time or after this time it can be planned to switch off the fluid unit. The control unit may then provide an appropriate control signal to the second valve unit to provide a fluidically communicating connection between the fluid reservoir and the portion of the fluid passage adjacent the second valve unit which extends to the second end portion and which may include the fluid choke. During the opening phase of the second valve unit caused thereby, it may be provided that the control unit monitors a change in the pressure in the fluid reservoir and, when a predeterminable pressure value is reached, makes a suitable activation or activation change for the second valve unit in order to interrupt the fluidically communicating connection between the fluid reservoir and the second end region of the fluid channel Depending on the pressure of the working gas stored in the fluid reservoir, during the opening phase of the second valve assembly, either fluid can be sucked into the second end portion of the fluid passage or fluid can be discharged from the second end portion of the fluid passage. In any case, it is important that, on the basis of the known volume of the fluid reservoir and the known volume of the section of the fluid channel connected to the second valve unit and extending to the second end region, an exact determination of the quantity of liquid received in the second end region or discharged from the second end region is achieved.

As an example, it is provided that a pressure threshold value and/or a time period for the opening phase of the second valve unit are dimensioned in such a way that no complete pressure equalization takes place between the fluid reservoir and the second end region of the fluid channel Rather, it is advantageous if, during the opening phase of the second valve unit, only a partial pressure compensation takes place between the fluid reservoir and the section of the fluid channel adjoining the second valve unit and extending to the second end region, as this facilitates detection of the pressure signal of the pressure sensor by the control unit. This is due to the fact that in a first phase of pressure equalization between the fluid reservoir and the section of the fluid channel adjacent to the second valve unit, a large pressure change occurs in the fluid reservoir which leads to a large change in the pressure signal of the pressure sensor and can therefore also be evaluated in the control unit with a high degree of accuracy. According to this, it is advantageous if a volume limited by the fluid reservoir is larger than a maximum dosing volume corresponding to the maximum volume of fluid that must be output by the dosing unit.

It is advantageous if a volume limited by the fluid reservoir corresponds to 1.5 to 25 times a maximum dosing volume. The dosing operation is based on the fact that the compressible working gas, before providing the fluidically communicating connection between the fluid reservoir and the second end region of the working channel, is selectively brought to a pressure level below an ambient pressure or to a pressure level above an ambient pressure in order to subsequently carry out a pressure equalization between the known volume of the working gas contained in the fluid reservoir and the also known volume of the working gas contained in the portion of the fluid channel extending between the second valve unit and the second end region. The smaller the volume of the fluid reservoir compared to the maximum dosing volume, the greater the pressure difference between the working gas stored in the fluid reservoir and the ambient pressure must be, which on the one hand places increased demands on the fluid unit and on the other hand increases the probability of an undesired pressure pulse on the fluid to be dosed, but is advantageous from a metrological point of view with regard to the pressure signal of the pressure sensor. If, on the other hand, the volume of the fluid reservoir is more than twice as large as the maximum dosing volume, the pressure difference between the fluid unit and the ambient pressure is low, and the probability of an undesired pressure pulse on the fluid to be dosed is low. If necessary, it may be possible to adjust the volume of the fluid reservoir, for example by means of a manually or automatically adjustable piston and/or by coupling several individual fluid reservoirs which can be separated from each other or connected to each other with suitable valve units, in order to be able to make an advantageous adjustment to the requirements of the liquid to be metered.

Preferably, a second pressure sensor is connected between the second valve unit and the fluid choke or between the fluid choke and the second end portion connected to the control unit, and the control unit is adapted to provide a final signal in response to a pressure signal of the second pressure sensor. With the second pressure sensor, a pressure profile or pressure sequence can be determined which is set in the portion of the fluid channel extending between the second valve unit and the second end region after closing the second valve unit and associated separation of the fluidically communicating connection between the fluid channel and the second end portion. As an example, it can be provided to carry out an optimisation of the dosing process on the basis of the pressure signal of the second pressure sensor in such a way that the pressure value, which must be achieved in the fluid store before the second valve unit is opened in order to carry out a suction operation or an output operation, can be adapted on the basis of a pressure profile determined in a preceding dosing operation or on the basis of a current pressure in this section of the fluid channel, in particular in order to minimise a difference between the pressure profile determined and a predetermined pressure profile stored in the control unit.

According to a second aspect the task of the invention is solved by a procedure with the following steps: providing a negative pressure to a fluid reservoir formed in a fluid passage between a first valve unit associated with the fluid passage and a second valve unit associated with the fluid passage while the first valve unit is open and while the second valve unit is closed; determining a fluid pressure in the fluid reservoir with a pressure sensor and providing an electrical pressure signal of the pressure sensor to a control unit; providing a closing signal to the first valve unit upon reaching a predeterminable first fluid pressure in the fluid reservoir by the control unit; providing an opening signal to the second valve unit after the control unit has reached the first fluid pressure and monitoring a pressure rise in the fluid reservoir during an opening state of the second valve unit and while a second end region of a fluid channel is immersed in a liquid to be metered; providing a closing signal to the second valve unit when the control unit has reached a predeterminable second fluid pressure in the fluid reservoir.

In order to carry out the process, it is thus intended to first bring the working gas contained in the section of the fluid channel between the first end section and the first valve unit and the working gas contained in the fluid reservoir to a predeterminable pressure level below an ambient pressure. Here it is assumed that the fluid unit is only operated in a controlled mode (open loop mode) to provide a negative pressure and that the pressure in the fluid reservoir is influenced by a pressure-dependent control of the first valve unit as a function of the pressure signal of the pressure sensor. After closing the first valve unit, a precisely defined volume of the working gas with a known negative pressure is enclosed in the fluid reservoir. In a subsequent step, a pressure equalization between the fluid reservoir and the section of the fluid channel extending between the second valve unit and the second end region can then be carried out by controlling and opening the second valve unit, whereby in practice negative pressure is applied to this section of the fluid channel.

If it is ensured that the second end portion or a pipette attached to the second end portion is immersed in a liquid at the time of applying a negative pressure (partial vacuum) to the second end portion of the fluid channel, a quantity of liquid in the second end portion or the pipette attached thereto is sucked in during pressure equalization between this portion of the fluid channel and the fluid reservoir. The volume of this amount of fluid is in an accurately predictable relationship to the volumes of the fluid reservoir and the portion of the fluid passage extending from the second valve unit to the second end portion, and to a pressure adjusting in this volume after opening the second valve unit for the working gas. For a particularly precise absorption of the desired quantity of liquid into the pipette or the second end region of the fluid channel, a pressure signal from the pressure sensor associated with the fluid reservoir is monitored by the control unit and the second valve unit is closed when a predeterminable pressure value is reached.

In practice, the situation may arise where the second valve unit is closed at a time when there is no complete pressure equalization between the fluid reservoir and the second end area of the fluid channel.

If a fluid choke is arranged upstream or downstream of the second valve unit in the fluid channel, this results in a further pressure equalization taking place between this section of the fluid channel and the section of the fluid channel arranged downstream of the fluid choke and extending to the second end region, if appropriate also after the second valve unit has been closed, as a function of a volume of a section of the fluid channel extending between the second valve unit and the fluid choke. In this case, it may be necessary to control the second valve unit in advance in terms of time and to separate the fluidically communicating connection between the fluid reservoir and the second end region of the fluid channel as a result, in order to ensure that the fluid is precisely absorbed in the second end region or in the pipette attached thereto.

The method is designed to provide an overpressure to the fluid reservoir while the first valve unit is open and while the second valve unit is closed, and to output a closing signal to the first valve unit through the control unit, as soon as a predeterminable third fluid pressure is reached in the fluid reservoir and in that the opening signal is then made available to the second valve unit by the control unit and a pressure drop occurs in the fluid reservoir during the opening state of the second valve unit and a closing signal is made available to the second valve unit by the control unit when a predeterminable second fluid pressure in the fluid reservoir is reached.

The method steps for providing an overpressure to the fluid reservoir when the first valve unit is open and the second valve unit is closed and for providing the overpressure prevailing in the fluid reservoir to the second end region of the fluid channel after the first valve unit has been closed and the second valve unit has been opened serve to output the quantity of liquid received in the second end region or a pipette connected thereto. The pressure signal of the pressure value determined by the pressure sensor in the fluid reservoir is monitored and the second valve unit is switched off when a preset pressure value is reached. If a fluid choke is arranged between the second valve unit and the second end region of the fluid channel, it is possible to provide, in a similar manner as in the previous application of negative pressure to the second end region of the fluid channel, for the second valve unit to be switched off in advance in order to take into account a pressure equalisation, which continues to take place even after the fluidically communicating connection between the fluid reservoir and the second end region has been blocked by closing the second valve unit, between a section of the fluid channel upstream of the fluid choke and a section of the fluid channel downstream of the fluid choke.

In a further configuration of the method, it is provided that a pressure signal of a second pressure sensor connected to the control unit and connected between the second valve unit and the fluid choke or between the fluid choke and the second end region is used by the control unit to determine a dosing end and to output an end signal, and that the end signal is provided to a drive arrangement for driving a drive. The pressure signal of the second pressure sensor can be evaluated by the control unit both during the performance of a suction operation for the liquid and during the performance of an output operation for the liquid. As an example, the pressure signal of the second pressure sensor can be used during the execution of the suction operation to determine a point in time at which there is an equilibrium between the negative pressure of the working gas taken up in the second end region and the quantity of liquid sucked in in the second end region. The control unit can determine this point in time, also known as the end of dosing, by comparing the pressure signal with a stored pressure value in order to output a final signal at this point in time or shortly thereafter. The end signal can be used, for example, to control a drive unit that moves the dosing unit in such a way that the second end area or a pipette attached to it is removed from a liquid container in which the liquid to be sucked in is contained. Similarly, the pressure signal of the second pressure sensor may be used during the performance of the dispensing operation to determine a time at which a predeterminable quantity of liquid or all of the liquid received in the second end portion or in a pipette attached thereto has been dispensed, to displace the Dosing unit such that the second end portion or a pipette attached thereto is immersed again in a liquid container in which liquid to be aspirated is received, to subsequently perform a new aspiration operation for the liquid.

The further design of the procedure provides that the pressure signal of the second pressure sensor is evaluated, in particular exclusively, after the closing signal has been made available to the second valve unit. This ensures that the pressure signal of the second pressure sensor is only used if there are no large pressure fluctuations or pressure impulses which would require complex filtering or other signal processing for this pressure signal. Rather, the pressure signal of the second pressure sensor is used, in particular exclusively, to observe a pressure change in the section of the fluid channel which is connected to the second valve unit during a compensation phase after blocking of the fluidically communicating connection between the fluid reservoir and this section of the fluid channel. The pressure signal of the second pressure sensor is preferably provided to the control unit as an alternative to the pressure signal of the first pressure sensor, so that the control unit requires only one (single) evaluation circuit for the evaluation of pressure signals and thus has an advantageous structure.

BRIEF DESCRIPTION OF THE DRAWINGS

An advantageous form of the invention is shown in the drawing. Here shows.

DETAILED DESCRIPTION

Figure 1:
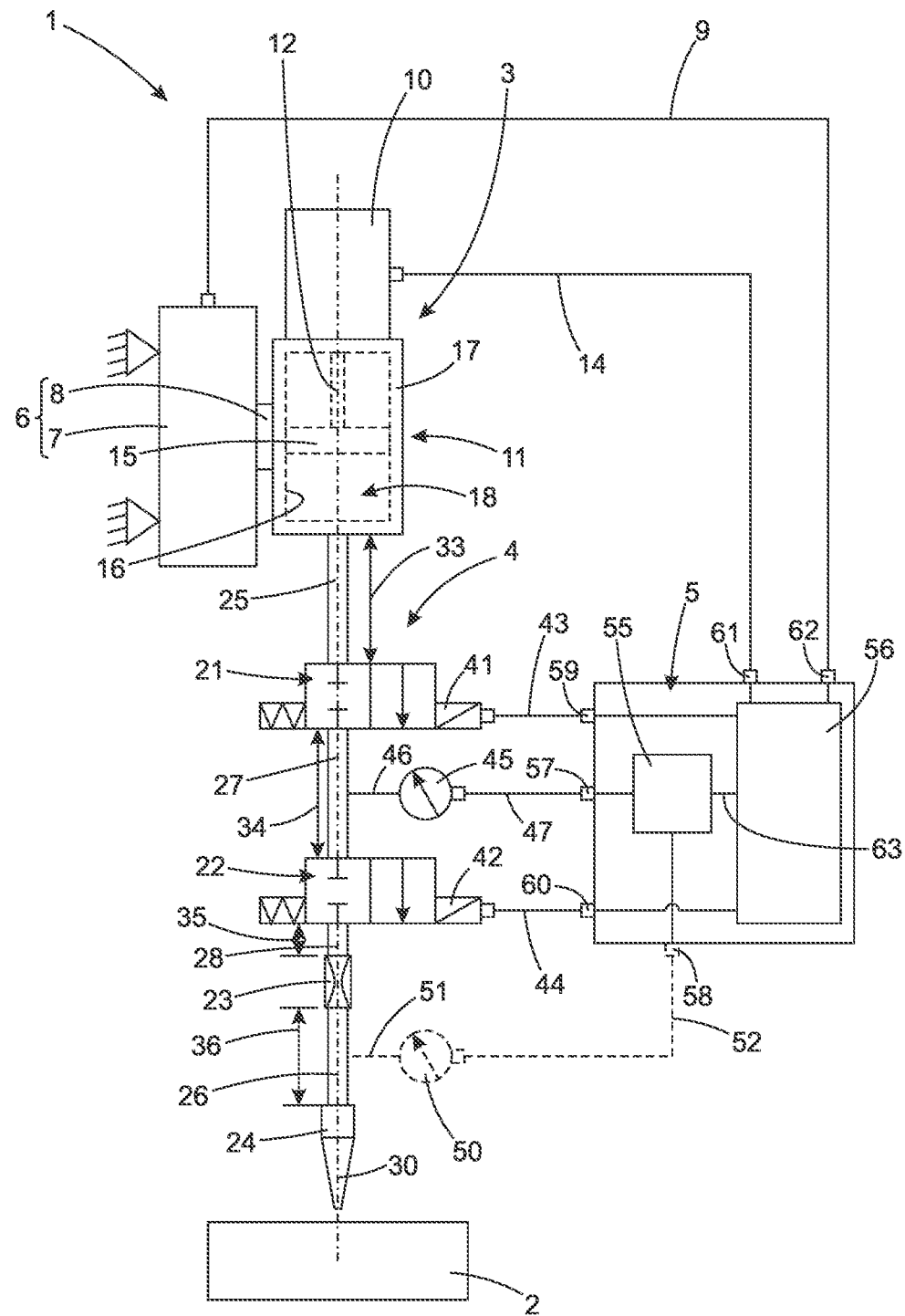
FIG. 1 shows a strictly schematic representation of a dosing unit mounted on a drive unit.

A dosing unit 1 shown schematically in FIG. 1 is designed for dosing a liquid which can be taken up purely as an example from a storage container 2 and discharged into sample containers not shown in more detail. Accordingly, the term "dosing" is to be understood to mean both the targeted uptake of liquid from the storage container 2 and the release of exactly predefinable volumes of liquid into the sample containers (not shown).

Depending on the quantity of liquid to be dispensed, it may be planned to dispense the liquid absorbed from the storage container 2 into one sample container during a single dispensing process. Alternatively, it may be provided that the liquid taken up from storage container 2 is discharged into one or more sample containers in several successive discharges, whereby the respective quantities of liquid discharged may be identical or different.

The dosing unit 1 comprises a fluid unit 3, a fluid channel 4 as well as a control unit 5. Furthermore, purely by way of example, it is provided that the fluid unit 3 and the fluid channel 4 attached thereto are coupled to a drive member 8 of a drive unit 6, which is movably accommodated on a drive housing 7 and is designed as a linear drive. This allows the fluid unit 3 and the fluid channel 4 to be moved vertically upwards and downwards as shown in FIG. 1, for example to cause the fluid channel 4 to be partially immersed in the liquid in the reservoir 2 or the fluid channel 4 to be removed from the reservoir 2. As an example, the drive unit 6 is electrically connected to the control unit 5 via a control line 9.

As an example, it is provided that the fluid unit 3 comprises an electric linear drive 10 as well as a pneumatic cylinder 11, wherein a piston rod 12 of the pneumatic cylinder 11 is coupled to a linearly movable rotor of the linear drive 10. This allows a working piston 15 of the pneumatic cylinder 11 connected to the piston rod 12 to be displaced linearly in a working recess 16 of a cylinder housing 17 and thereby change a volume of a working chamber 18. As an example, it is planned that the electric linear drive 10 is electrically connected to the control unit 5 via a control line 14.

The working chamber 18 is connected to the fluid channel 4 in a fluidic communicating manner in the manner not described in detail and is designed purely exemplarily as a tube with a circular cylindrical cross-section. The fluid channel 4 comprises a first valve unit 21, a second valve unit 22, a fluid choke 23 and, by way of example, a pipette 24. A first end region 25 of the fluid channel 4 extends between the fluid unit 3 and the first valve unit 21. A second end region 26 of the fluid channel 4 extends between the fluid choke 23 and the pipette 24. A section of the fluid channel 4 extended between the first valve unit 21 and the second valve unit 22 is also referred to as a fluid reservoir 27. Further, a fluid passage portion 28 extends between the second valve unit 22 and the fluid choke 23.

Exemplarily, it is provided that the cross-sections of the first end region 25, the second end region 26, the fluid reservoir 27 and the fluid channel section 28 are each identical and known. Furthermore, extensions 33, 34, 35, 36 of these sections 25, 26, 27, 28 of the fluid channel 4 are also known along an extension axis 30 running in the vertical direction as shown in FIG. 1, so that the exact volume is also known for each of the sections 25, 26, 27, 28 of the fluid channel 4.

The first valve unit 21 and the second valve unit 22 are each designed as electropneumatic 2/2-way valves. The first valve unit 21 serves to selectively release or block a fluidically communicating connection between the first end area 25 of the fluid channel 4 and the fluid reservoir 27. The second valve unit 22 is designed to selectively release or block a fluidically communicating connection between the fluid reservoir 27 and the second end area 26 of the fluid channel 4. As an example, the two valve units 21 and 22 are each designed as solenoid valves whose respective solenoid drives 41 and 42 are each connected to the control unit 5 via control lines 43 and 44. It is preferred that the two valve units 21, 22 are designed as normally closed (NC) switching valves.

The fluid choke 23 has a choke cross-section shown only schematically which is smaller than the cross-sections of the first end portion 25 and of the second end portion 26 and of the fluid reservoir 27 and of the fluid channel portion 28 to provide a throttling effect in the fluid channel for fluid flow between the fluid channel portion 28 and the second end portion 26 of the fluid channel independently of the direction of flow of the working gas contained in the fluid channel 4 which is not shown in detail. As an example, the fluid choke 23 has a flow resistance for the working gas in the fluid channel 4 which is in a range between 10.000 and 10.000.000 of the flow resistance of the first end region 25, the second end region 26, the fluid reservoir 27 and the fluid channel section 28.

A first pressure sensor 45 is assigned to the fluid reservoir 27, which is designed for detecting a fluid pressure in the fluid reservoir 27 and is in fluidic communication with the fluid reservoir 27 via a measuring line 46. Furthermore, the first pressure sensor 45 is electrically connected to the control unit 5 via a signal line 47 in order to enable a transmission of its electrical pressure signal.

Optionally, a second pressure sensor 50 can be arranged between the second valve unit and the second end region 26 of the fluid channel 4, the measuring line 51 of which is exemplarily connected to the second end region 26 of the fluid channel 4 in order to carry out a pressure detection there, wherein an electrical pressure signal of the second pressure sensor 50 can be provided to the control unit 5 via a signal line 52.

The pipette 24 is connected in an unspecified manner to the second end portion 26 and also has a known volume which is at least partially used for receiving and subsequently dispensing liquid.

The control unit 5 comprises a microprocessor 55 and an electrical output stage 56. The microprocessor 55 is electrically connected to inputs 57, 58 to which signal lines 47 and 52 are connected. Furthermore, the microprocessor 55 is connected to outputs 59, 60, 61, 62 to which the control lines 9, 14, 43 and 44 are connected. Depending on a stored sequence program, the microprocessor 55 is designed to evaluate sensor signals from the first pressure sensor 45 and, if necessary, sensor signals from the second pressure sensor 50 in order to generate control signals which are provided to the electrical output stage 56 via a connecting line 63. In the electrical output stage 56, the control signals are converted into electrical energy currents which are adapted to the requirements of the components connected to the outputs 59 to 63, such as the drive unit 6, the linear drive 10 and the magnetic drives 41 and 42. Accordingly, the electrical output stage 56 is used for electrical control of the components connected to outputs 59 to 63 as a function of the control signals of the microprocessor 55.

Figure 2:
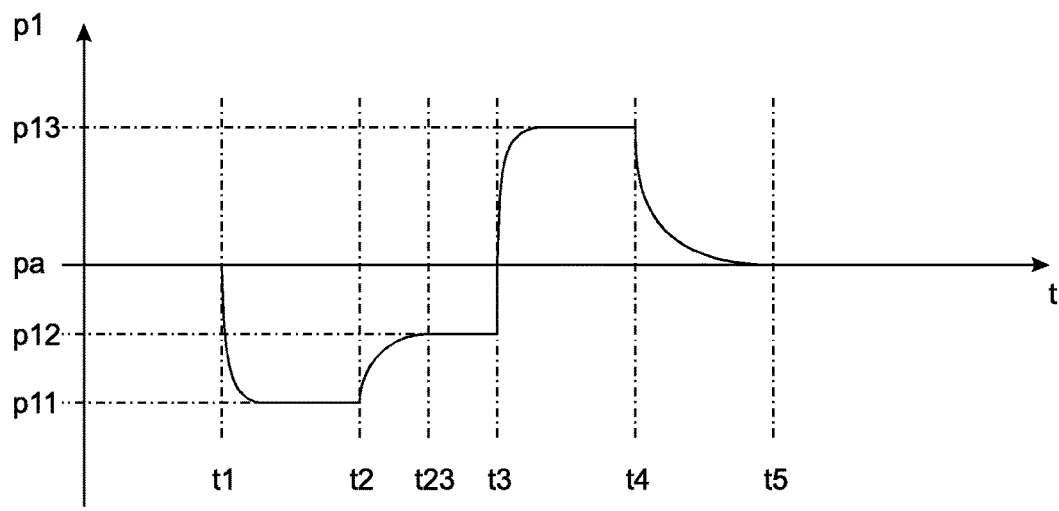
FIG. 2 shows a strictly schematic representation of a pressure curve in the fluid reservoir of the dosing unit, FIG. 3 a strictly schematic representation of a pressure curve in the second section of the fluid channel of the Dosing unit.
Figure 4:
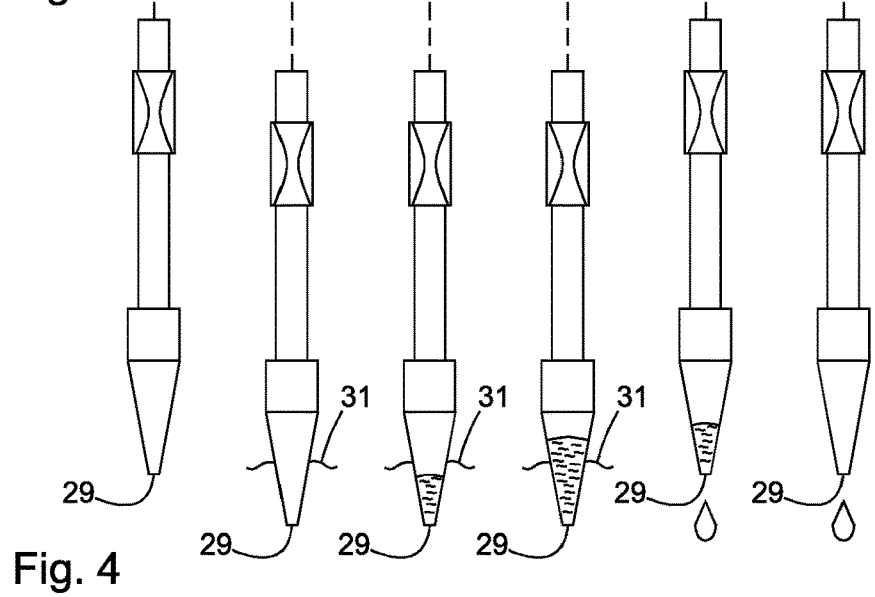
FIG. 4 shows a strictly schematic representation of the second section of the fluid channel of the dosing unit in chronological order to the representation of FIG. 3.

As an example, the following operating mode can be provided for dosing unit 1, which is explained below in connection with FIGS. 1 to 4:

At a time t0, the two valve units 21, 22 are closed, the pressure p1 prevailing in the fluid reservoir 27, which is indicated in the diagram of FIG. 2, corresponds at this time to an ambient pressure pa and is measured with the first pressure sensor 45 and provided as an electrical sensor signal to the control unit 5. In the second end area 26 of the fluid channel 4 and in the pipette 24 there is a pressure p2 which is equal to the ambient pressure pa at this time. As shown in FIG. 4, the pipette 24 is neither filled with liquid nor immersed in liquid shortly after time t0.

In the time period between the time t0 and the time t1, a control signal is output from the microprocessor 55 of the control unit 5 via the connecting line 63 to the electrical output stage 56. This causes electrical energy to be supplied to the drive unit 6, resulting in a lowering movement of the dosing unit 1 along the extension axis 30. As a result, the pipette 24 is immersed in the liquid absorbed in the storage container 2, so that an opening 29 on the front of the pipette 24, which is not shown in detail, lies below a liquid level 31 of the liquid.

In addition, a further control signal is output from the microprocessor 55 during this period, which is transmitted via the connecting line 63 to the electrical output stage 56 in order to provide electrical energy to the linear drive 10. As a result, the linear actuator 10 performs a stroke movement which results in a vertical upward displacement of the piston rod 12 and the associated working piston 15. The decisive factor, however, is that the relative movement of the working piston 15 relative to the cylinder housing 17 enlarges the working chamber 18. Since the working chamber 18 is only in fluid communication with the first end area 25 of the fluid channel 4, but has no connection to the environment, the pressure drop in the working chamber 18 is caused by the enlargement of the working chamber 18.

At time t1, the microprocessor 55 transmits a control signal to the electrical output stage 56 to effect a supply of electrical power to the solenoid actuator 41 of the first valve unit 21 so that it is transferred from the normally closed state to an unclassified open state and releases a fluidically communicating connection between the first end region 25 of the fluid passage 4 and the fluid reservoir 27. This results in a pressure equalization between the working fluid received at a first pressure in the working recess 16 and in the first end region 25 of the fluid channel 25 and the working fluid received at a second pressure in the fluid reservoir 27. Accordingly, the first pressure sensor 45 determines a pressure drop in the fluid reservoir 27 from time t1, from the value pa to the value p11, as can be seen in FIG. 2. Since the second valve unit 22 is closed in this phase, there is no change in pressure in the sections of the fluid channel 4 located downstream of the second valve unit 22.

As an example, it is provided that the control unit 5 is designed for pressure-dependent actuation of the first valve unit 22 and, when the predeterminable pressure value p11 is present in the fluid reservoir 27, actuates the first valve unit 21 in order to separate the connection between the first end region 25 of the fluid channel 4 and the fluid reservoir 27. This is the case for example between time t1 and time t2.

Figure 3:
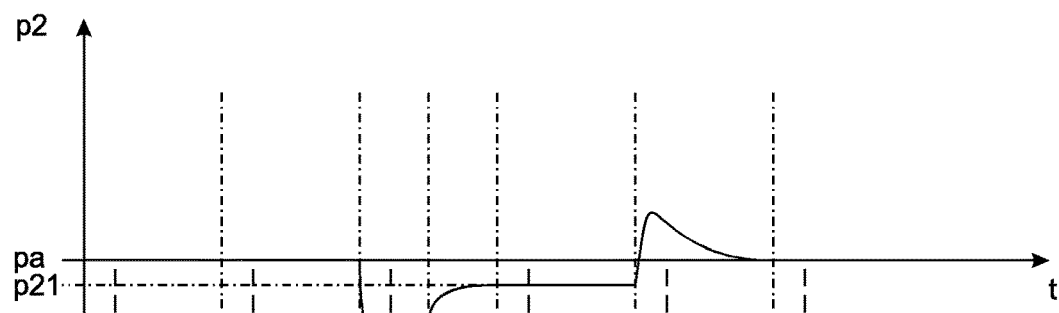

At time t2, the second valve unit 22 is actuated so that a pressure equalization takes place between the pressurized working gas accommodated in the fluid reservoir 27 and the pressurized working gas accommodated in the fluid channel section 28, in the fluid choke 23, in the second end region 26 of the fluid channel 4 and in the pipette 24 and pressurized with ambient pressure pa. The pressure of the working gas in the second end area 26 of fluid channel 4 is shown in FIG. 3 and is designated p2. Before time t2, the pressure p2 equals the ambient pressure pa. After time t2, the result is a pressure p21 in sections 23, 24, 26, 27 and 28 of fluid channel 4, where the pressure p21 is lower than the ambient pressure pa. This allows liquid from reservoir 2 to be sucked into pipette 24 against gravity, as symbolized in FIG. 4.

During this suction process, the pressure of the fluid reservoir 27 is also monitored by means of the first pressure sensor 45, whereby the second valve unit 22 is activated as soon as the first pressure sensor 45 determines a pressure value p12 in the fluid reservoir 27, which is purely exemplary at time t23. This control of the second valve unit 22 separates the fluidically communicating connection between the fluid reservoir 27 and the second end area 26 of the fluid channel 4.

Due to the throttling effect of the fluid choke 23, the pressure compensation between the fluid reservoir 27 and the second end area 26 of the fluid channel 4 takes place with a small gradient than was the case for the previous pressure compensation between the first end area 25 of the fluid channel 4 and the fluid reservoir 27.

After actuation of the second valve unit 22 at time t23, a final, slight pressure equalization takes place between the fluid channel section and the second end region 26 of the fluid channel 4, which is connected thereto by the fluid choke 23. By way of example, the value p21 is reached at time t3. At this time, the volume of liquid to be absorbed in the pipette 24 has completely flowed in. The negative pressure p21 remaining in the second end range 26 corresponds to the hydrostatic pressure which is introduced into the working gas by the liquid volume absorbed in the pipette 24.

Between time t3 and time t4, a control signal is output from the microprocessor 55 which is transmitted to the electrical output stage 56 via the connecting line 63 to provide electrical power to the linear drive 10. As a result, the linear actuator 10 performs a stroke movement, resulting in a relative movement of the working piston 15 relative to the cylinder housing 17 and a reduction of the working chamber 18. This causes an increase in pressure in the working chamber 18.

At time t3, the microprocessor 55 transmits a control signal to the electrical output stage 56 to cause electrical power to be supplied to the solenoid actuator 41 of the first valve unit 21 so that it is transferred from the normally closed state to the open state and releases a fluidically communicating connection between the first end region 25 of the fluid channel 4 and the fluid reservoir 27. Accordingly, the first pressure sensor 45 detects a pressure increase in the fluid reservoir 27 from time t3, as shown in FIG. 2. When the pre-settable pressure value p13 is reached, the first valve unit 21 is activated again in order to disconnect the fluidically communicating connection between the fluid unit 3 and the fluid reservoir 27, so that the pressure in the fluid reservoir 27 remains constant from this point on.

Furthermore, in the period between time t3 and time t4, a control signal is output from the microprocessor 55 of the control unit 5 via the connection line 63 to the electrical output stage 56 in order to effect a supply of electrical energy to the drive unit 6 and thus to cause a stroke movement of the dosing unit 1 along the extension axis 30. This removes the pipette 24 from the unspecified liquid contained in reservoir 2. It may also be provided to remove the reservoir 2 by means of an unspecified movement unit and replace it with an unspecified sample holder into which the liquid received in the pipette 24 is to be dispensed.

Since the second valve unit 22 is closed in the period between t3 and t4, there is no change in pressure in the sections of the fluid channel 4 located downstream of the second valve unit 22.

At time t4, the second valve unit 22 is actuated so that a pressure equalization takes place between the pressurized working gas received in the fluid reservoir 27 and the working gas received in the fluid channel section 28, in the fluid choke 23, in the second end region 26 of the fluid channel 4 and in the pipette 24 and subjected to the negative pressure p21. This results in a pressure curve shown in FIG. 3 in these sections 23, 24, 26, 27 and 28 of the fluid channel 4, the resulting pressure being initially higher than the ambient pressure pa, whereby liquid can be discharged from the pipette 24 as symbolized in FIG. 4.

Due to the throttling effect of fluid choke 23, the pressure equalization takes place with a smaller gradient than was the case for the previous pressure equalization between the first end area 25 of fluid channel 4 and fluid reservoir 27. At the end of the output process, for example when all the liquid has been output from the pipette 24, the pressure in the fluid reservoir 27 corresponds to the ambient pressure pa.

What is claimed is:

1. A method for dosing a liquid by sequentially providing negative pressure and positive pressure to a fluid reservoir, the fluid reservoir being disposed in a fluid passage and being limited by a first valve unit associated with the fluid passage and being further limited by a second valve unit associated with the fluid passage, wherein the second valve unit is disposed at a distance from the first valve unit along the fluid passage, the method comprising:

opening the first valve unit while the second valve unit is closed;

providing a negative pressure to the fluid reservoir;

determining a fluid pressure in the fluid reservoir with a pressure sensor and providing an electrical pressure signal of the pressure sensor to a control unit;

closing the first valve unit when a predefined first fluid pressure in the fluid reservoir is determined by the control unit to block the fluid reservoir between the first valve unit and the second valve unit and to thereby store the negative pressure in the fluid reservoir;

opening the second valve unit;

monitoring a pressure rise in the fluid reservoir during an opening state of the second valve unit and while an end region of the fluid passage is immersed in a liquid to be metered;

closing the second valve unit when the control unit determines a predefined second fluid pressure in the fluid reservoir opening the first valve unit;

providing positive pressure to the fluid reservoir, while the first valve unit is open and while the second valve unit is closed;

closing the first valve unit as soon as a predefined third fluid pressure is reached in the fluid reservoir;

opening the second valve unit to achieve a pressure drop in the fluid reservoir during the opening state of the second valve unit; and closing the second valve unit when a predefined fourth fluid pressure is reached in the fluid reservoir.

2. The method according to claim 1, wherein a pressure signal of a second pressure sensor which is connected to the control unit and which is disposed between the second valve unit and a fluid choke or between a fluid choke and the end region of the fluid passage, is used by the control unit for determining a dosing end pressure, wherein the control unit provides an end signal to a linear drive when the dosing end pressure has been determined.

3. The method according to claim 2, wherein the pressure signal of the second pressure sensor is evaluated after the predefined fourth fluid pressure is reached in the fluid reservoir.

* * * * *